(12) United States Patent
Liang

(10) Patent No.: US 9,952,741 B2
(45) Date of Patent: Apr. 24, 2018

(54) MOBILE TERMINAL APPLICATION ICON MANAGEMENT METHOD AND MOBILE TERMINAL

(75) Inventor: Xiaohui Liang, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 879 days.

(21) Appl. No.: 14/382,592

(22) PCT Filed: May 14, 2012

(86) PCT No.: PCT/CN2012/075468
§ 371 (c)(1),
(2), (4) Date: Sep. 3, 2014

(87) PCT Pub. No.: WO2013/131321
PCT Pub. Date: Sep. 12, 2013

(65) Prior Publication Data
US 2015/0026617 A1  Jan. 22, 2015

(30) Foreign Application Priority Data

Mar. 8, 2012 (CN) .......................... 2012 1 0059491

(51) Int. Cl.
*G06F 3/0481* (2013.01)
*G06F 9/44* (2018.01)
(Continued)

(52) U.S. Cl.
CPC ........ *G06F 3/04817* (2013.01); *G06F 3/0482* (2013.01); *G06F 8/61* (2013.01); *G06F 9/4443* (2013.01); *G06F 3/048* (2013.01)

(58) Field of Classification Search
CPC ... G06F 3/00; G06F 3/14; G06F 3/041; G06F 3/048; G06F 3/0481; G06F 3/0482;
(Continued)

(56) References Cited

U.S. PATENT DOCUMENTS 5,544,302 A * 8/1996 Nguyen ................ G06F 9/4443
715/781
7,068,288 B1 * 6/2006 Good ................... G06F 3/0481
345/619
(Continued)

FOREIGN PATENT DOCUMENTS

CN  102236525 A  11/2011
CN  102306080 A  1/2012
(Continued)

OTHER PUBLICATIONS

International Search Report in international application No. PCT/CN2012/075468, dated Dec. 20, 2012.
(Continued)

*Primary Examiner* — Xiomar L Bautista
(74) *Attorney, Agent, or Firm* — Oppedahl Patent Law Firm LLC

(57) ABSTRACT

Disclosed are a mobile terminal application icon management method and a mobile terminal. The mobile terminal application icon management method comprises: presetting class information about an application, and establishing a mapping relation table among an application class, a screen serial number of a display screen and an application icon; receiving an object moving instruction, obtaining regular pattern information corresponding to a moved object according to the object moving instruction, and displaying the regular pattern information; and after the moved object is successfully moved to the corresponding region of a regular pattern, updating the corresponding mapping relation table among the application class, the screen serial number of a display screen and the application icon. The present invention simplifies the management operation process of an application icon, and achieves batch management and multimodal management of an application icon, thereby greatly
(Continued)

facilitating the management operation of a user in respect of an application icon.

8 Claims, 6 Drawing Sheets

(51) Int. Cl.
*G06F 3/0482* (2013.01)
*G06F 9/445* (2018.01)
*G06F 3/048* (2013.01)

(58) Field of Classification Search
CPC ...... G06F 3/0484; G06F 3/04817; G06F 8/61; G06F 9/445; G06F 9/4443
See application file for complete search history.

(56) References Cited

U.S. PATENT DOCUMENTS

| | | |
|---|---|---|
| 7,350,158 B2 | 3/2008 | Yamaguchi |
| 7,693,877 B1* | 4/2010 | Zasman ............ G06F 17/30221 707/662 |
| 2004/0155907 A1 | 8/2004 | Yamaguchi |
| 2007/0050811 A1* | 3/2007 | Moriwaki .......... H04N 5/44543 725/37 |
| 2010/0333030 A1* | 12/2010 | Johns .................. G06F 3/04815 715/834 |
| 2011/0258582 A1 | 10/2011 | Bang |
| 2012/0052918 A1 | 3/2012 | Yang |

FOREIGN PATENT DOCUMENTS

| | | |
|---|---|---|
| CN | 102306084 A | 1/2012 |
| CN | 102360266 A | 2/2012 |
| CN | 102364438 A | 2/2012 |
| EP | 2426898 A2 | 3/2012 |

OTHER PUBLICATIONS

English Translation of the Written Opinion of the International Search Authority in international application No. PCT/CN2012/075468, dated Dec. 20, 2012.

Supplementary European Search Report in European application No. 12870833.6, dated Feb. 20, 2015.

* cited by examiner

MOBILE TERMINAL APPLICATION ICON MANAGEMENT METHOD AND MOBILE TERMINAL

TECHNICAL FIELD

The disclosure relates to the field of mobile terminal techniques, and in particular to a method for application icon management in a mobile terminal, and a mobile terminal.

BACKGROUND

With the upgrading of communication products, a mobile terminal such as a mobile phone or a Personal Digital Assistant (PDA) has become an indispensable communication tool, and various convenient and recreational applications appear on a mobile terminal.

On an existing mobile terminal, icons of various applications are either displayed all in one screen or displayed in multiple screens. Although icon display by multiple screens can facilitate a user in finding an application to some extent, but an existing method for application icon management in a mobile terminal has the following disadvantages:

(1) display of icons of various applications is not managed by class;

(2) one application icon management operation can handle only one icon at a time, instead of batch management of multiple icons;

(3) the icon of an application can be moved only after the application is installed;

(4) a user can complete a move of an icon of an application only after dragging the icon to a target screen.

SUMMARY

In view of this, it is desired that embodiments of the disclosure provide a method for application icon management in a mobile terminal, and a mobile terminal, capable of implementing batch management and multi-mode management of icons of applications of a mobile terminal.

To this end, the disclosure provides a method for application icon management in a mobile terminal, including steps of:

presetting information on a class to which an application belongs, and establishing a table of mapping relation among a class of applications, a screen, and an application;

receiving an icon object moving instruction, acquiring information on a rule graph corresponding to an icon object to be moved according to the icon object moving instruction, and displaying the information on the rule graph; and updating, after successfully moving the icon object to be moved to an area on the rule graph, a table of mapping relation among a class of applications, a screen, and an application according to the move.

In an embodiment, the step of establishing a table of mapping relation among a class of applications, a screen, and an application may include a step of:

respectively establishing a table mapping a class of applications to a screen, a table mapping an application to a class of applications, and a table mapping an application to a screen according to affiliation in storing an icon of an application in a screen and in storing a class of applications in a screen.

In an embodiment, the steps of acquiring information on a rule graph corresponding to an icon object to be moved according to the icon object moving instruction, and displaying the information on the rule graph may include steps of:

when it is determined according to the icon object moving instruction that the icon object to be moved is a class of applications, acquiring information on a single-layer annular graph marked with sequence numbers of screens, and displaying the information on the rule graph, wherein after the class of applications to be moved is moved to an area containing a sequence number of a target screen in the single-layer annular graph, it is determined whether there is enough space remaining in the target screen for storing the class of applications to be moved; and when there is enough space remaining in the target screen for storing the class of applications to be moved, the class of applications to be moved is moved to the area containing the sequence number of the target screen successfully.

In an embodiment, the steps of acquiring information on a rule graph corresponding to an icon object to be moved according to the icon object moving instruction, and displaying the information on the rule graph may include steps of:

when it is determined according to the icon object moving instruction that the icon object to be moved is an icon of an application, acquiring information on a double-layer annular graph marked with sequence numbers of screens and classes of applications, and displaying the information on the rule graph, wherein after the to-be-moved icon of the application is moved to an area containing a sequence number of a target screen or a target class of applications in the double-layer annular graph, it may be determined whether there is enough space remaining in the target screen or a screen containing the target class of applications for storing the to-be-moved icon of the application; and when there is enough space remaining in the target screen or the screen containing the target class of applications for storing the to-be-moved icon of the application, the to-be-moved icon of the application is moved to the area containing the sequence number of the target screen or the target class of applications successfully.

In an embodiment, the step of updating, after successfully moving the icon object to be moved to an area on the rule graph, a table of mapping relation among a class of applications, a screen, and an application according to the move may include steps of:

after the class of applications to be moved is successfully moved to the area containing the sequence number of the target screen in the single-layer annular graph, updating the table mapping a class of applications to a screen; and refreshing application class layout displayed on the current screen and application class layout displayed on the target screen; or after the to-be-moved icon of the application is successfully moved to the area containing the sequence number of the target screen or the target class of applications in the double-layer annular graph, updating the table mapping an application to a class of applications, or the table mapping an application to a screen; and refreshing application icon layout displayed on a current screen and application icon layout displayed on the target screen.

In an embodiment, the method may further include a step of: after the steps of presetting information on a class to which an application belongs, and establishing a table of mapping relation among a class of applications, a screen, and an application, updating the table mapping an application to a class of applications according to information on a class to which a new application belongs preset in installing the new application.

The disclosure further provides a mobile terminal, including a presetting module configured for: presetting information on a class to which an application belongs, and establishing a table of mapping relation among a class of applications, a screen, and an application;

a managing module configured for: receiving an icon object moving instruction; acquiring information on a single-layer annular graph or a double-layer annular graph according to the icon object moving instruction; and updating, after successfully moving the icon object to be moved to an area on the single-layer annular graph or the double-layer annular graph, a table of mapping relation among a class of applications, a screen, and an application according to the move; and a displaying module configured for: displaying the information on the rule graph.

In an embodiment, the managing module may be further configured for:

after a class of applications to be moved is moved to an area containing a sequence number of a target screen in the single-layer annular graph, determining whether there is enough space remaining in the target screen for storing the class of applications to be moved;

after the to-be-moved icon of the application is moved to an area containing a sequence number of a target screen or a target class of applications in the double-layer annular graph, determining whether there is enough space remaining in the target screen or a screen containing the target class of applications for storing the to-be-moved icon of the application; and updating the table mapping an application to a class of applications according to information on a class to which a new application belongs preset in installing the new application.

In an embodiment, the displaying module may be further configured for:

refreshing application class layout and application icon layout displayed on a current screen and on a target screen according to the table of mapping relation among a class of applications, a screen, and an application updated by the managing module.

In an embodiment, the mobile terminal may further include an installing module configured for: installing a new application; and after the new application is installed successfully, sending the managing module an icon management message corresponding to the installation, wherein the managing module may be further configured for: updating a table mapping an application to a class of applications according to the icon management message; and the displaying module may be further configured for: displaying icons of applications by class according to the table mapping an application to a class of applications updated by the managing module.

With the method for application icon management in a mobile terminal according to the disclosure, icons of installed applications are managed rapidly by screen or by class on a respective rule graph, such that with the disclosure, compared with an existing method for application icon management in a mobile terminal, icon management is simplified, and batch management and multi-mode management of icons of applications are achieved, thereby greatly facilitating application icon management by a user. Moreover, with the disclosure, it is possible to set in an installation phase of a new application a class to which the new application belongs, and directly manage display of the icon of the new application by class, thereby saving any icon display management after the new application is installed.

Implementation, features, and advantages of the disclosure will be further described with reference to accompanying drawings in combination with embodiments.

DETAILED DESCRIPTION

According to embodiments of the disclosure, information on a class to which an application belongs is preset, and a table of mapping relation among a class of applications, a screen, and an application is established; an icon object moving instruction is received, information on a rule graph corresponding to an icon object to be moved is acquired according to the icon object moving instruction, and the information on the rule graph is displayed; and after the icon object to be moved is successfully moved to an area on the rule graph, a table of mapping relation among a class of applications, a screen, and an application is updated according to the move.

A technical solution of the disclosure will be further elaborated with reference to the accompanying drawings in combination with specific embodiments. It should be understood that the specific embodiments described herein are only used to interpret the disclosure instead of limiting the disclosure.

Figure 1:
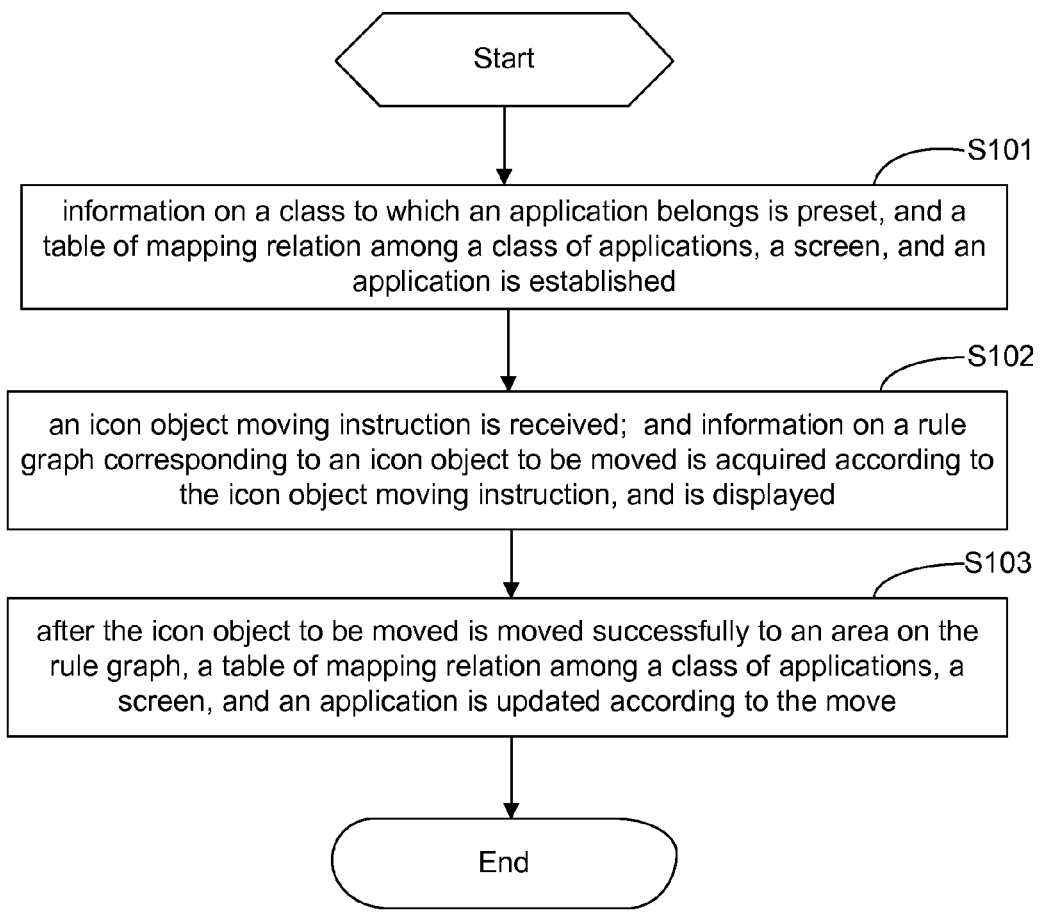
FIG. 1 is a flowchart of a method for application icon management in a mobile terminal according to an embodiment of the disclosure.

FIG. 1 is a flowchart of a method for application icon management in a mobile terminal according to an embodiment of the disclosure. As shown in FIG. 1, the method includes steps as follows.

In Step S101, information on a class to which an application belongs is preset, and a table of mapping relation among a class of applications, a screen, and an application is established.

In an embodiment, in addition to a default class of applications in a mobile terminal, a new class of applications may be added, and an existing class of applications may be modified or deleted through an application class customizing interface. Then, a table mapping a class of applications to a screen, a table mapping an application to a class of applications, and a table mapping an application to a screen are established respectively in advance according to affiliation in storing an icon of an application in a screen and in storing a class of applications in a screen.

The table mapping a class of applications to a screen (Class_Screen) indicates mapping relation between a class of applications and a screen of the mobile terminal (i.e., table Class_Screen hereafter).

The table mapping an application to a class of applications (App_Class) indicates mapping relation between an application and a class of applications (i.e., table App_Class hereafter).

The table mapping an application to a screen (App_Screen) indicates mapping relation between an application and a screen of the mobile terminal ((i.e., table App_Screen hereafter), where an application with its icon stored in the screen is not classified. Main fields of the table Class_Screen are as shown in Table 1, main fields of the table App_Class are as shown in Table 2, and main fields of the table App_Screen are as shown in Table 3.

TABLE 1

| Field | description |
| --- | --- |
| a class | the class contained in the screen with the sequence number |
| a sequence number of a screen | the sequence number of a screen in the mobile terminal |

TABLE 2

| Field | description |
| --- | --- |
| an application | an application belonging to the class of applications |
| a class | a class of applications contained in a screen of the mobile terminal |

TABLE 3

| Field | description |
| --- | --- |
| an application | an unclassified application |
| a sequence number of a screen | the sequence number of a screen in the mobile terminal |

In Step S102, an icon object moving instruction is received, information on a rule graph corresponding to an icon object to be moved is acquired according to the icon object moving instruction, and the information on the rule graph is displayed.

In an embodiment, when it is determined according to the icon object moving instruction that the icon object to be moved is a class of applications, information on a single-layer annular graph marked with sequence numbers of screens is acquired, and the single-layer annular graph is displayed on a current screen. When it is determined according to the icon object moving instruction that the icon object to be moved is an icon of an application, information on a double-layer annular graph marked with sequence numbers of screens and classes of applications is acquired, and the double-layer annular graph is displayed on a current screen.

In Step S103, after the icon object to be moved is moved successfully to an area on the rule graph, a table of mapping relation among a class of applications, a screen, and an application is updated according to the move.

In an embodiment, after the icon object to be moved is moved successfully to the area on the rule graph, the table mapping a class of applications to a screen, the table mapping an application to a class of applications, or the table mapping an application to a screen may be updated.

With the method for application icon management in a mobile terminal according to the disclosure, icons of installed applications are managed rapidly by screen or by class on a respective rule graph, such that with the disclosure, compared with an existing method for application icon management in a mobile terminal, icon management is simplified, and batch management and multi-mode management of icons of applications are achieved, thereby greatly facilitating application icon management by a user.

Figure 2:
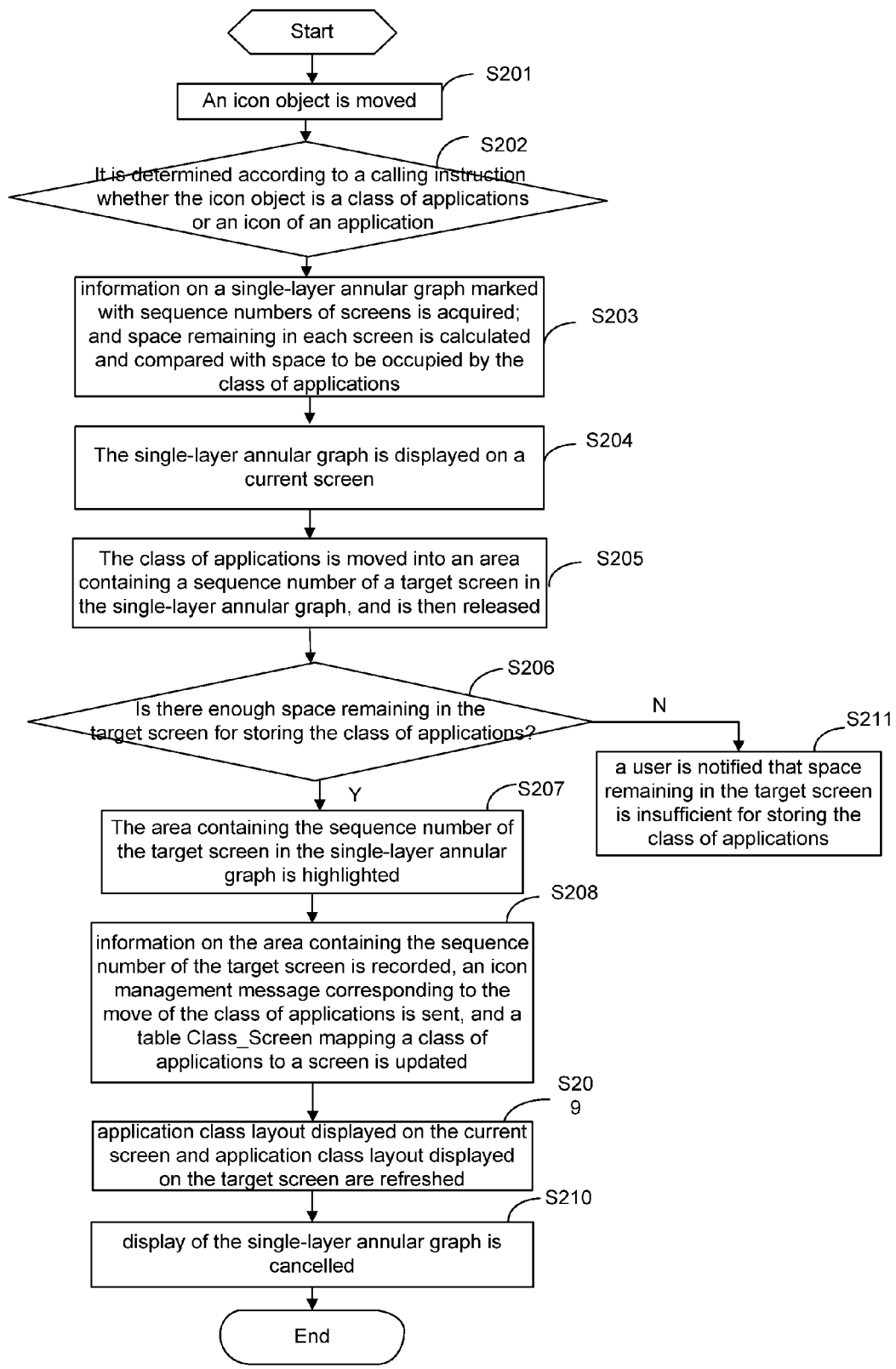
FIG. 2 is a flowchart of managing icon-display-by-screen by moving a class of applications in a method for application icon management in a mobile terminal according to an embodiment of the disclosure.

FIG. 2 is a flowchart of managing icon-display-by-screen by moving a class of applications in a method for application icon management in a mobile terminal according to an embodiment of the disclosure. As shown in FIG. 2, the flow of managing icon-display-by-screen by moving a class of applications according to the disclosure includes steps as follows.

In Step S201, an icon object is moved.

In an embodiment, after information on a class to which an application belongs is preset in the mobile terminal, and a table of mapping relation among a class of applications, a screen, and an application is established, an icon object of a class of applications or an icon of an application is dragged into a target screen or a target class of applications.

In Step S202, it is determined according to an icon object moving instruction whether the icon object is a class of applications or an icon of an application.

In an embodiment, when the icon object is moved, the type of the icon object (a class of applications or an icon of an application) needs to be determined in the first place according to the icon object moving instruction, and when the icon object is a class of applications, the flow goes to step S203.

In Step S203, information on a single-layer annular graph marked with sequence numbers of screens is acquired; and space remaining in each screen is calculated and compared with space to be occupied by the class of applications.

In an embodiment, when it is determined that the icon object is a class of applications, information on a single-layer annular graph marked with sequence numbers of screens is acquired, and space remaining in each screen is calculated and compared with space to be occupied by the class of applications. Here, the information on the single-layer annular graph may include a total size of the graph, a total number of screens in the mobile terminal, size of an area containing a sequence number of a screen, an identifier of a color of an area, an identifier of a color of storage space occupied by each class of applications and icons of applications belonging to the each class in a screen, and the like.

In Step S204, the single-layer annular graph marked with sequence numbers of screens is displayed on a current screen.

Figure 4:
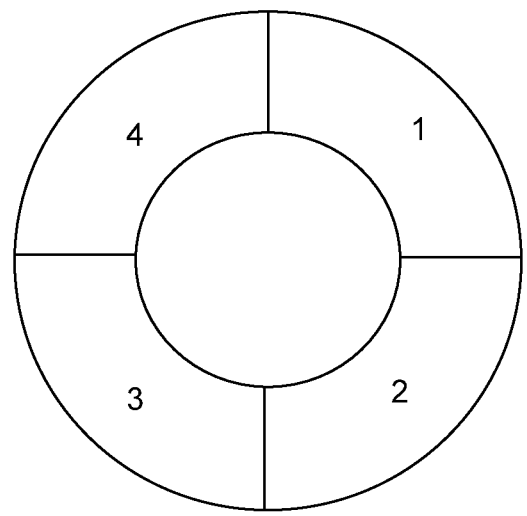
FIG. 4 is a schematic diagram of a structure of a single-layer annular graph displayed on a current screen in case an icon object to be moved is a class of applications in a method for application icon management in a mobile terminal according to an embodiment of the disclosure.

In an embodiment, the single-layer annular graph displayed here, as shown in FIG. 4, includes 4 screens with sequence numbers 1, 2, 3, 4, respectively; and areas containing the sequence numbers of screens may be distinguished from each other by color. When there is enough space remaining in a screen, as calculated by the mobile terminal, for storing icons of all applications belonging to the class of applications, the sequence number of the screen is shown in bright yellow. When the screen does not have sufficient free space, as calculated by the mobile terminal, for storing icons of applications belonging to the class of applications, the sequence number of the screen is shown in black. Here, sequence numbers of screens 1, 3, 4 are shown in bright yellow, indicating that each of screen 1, screen 3, and screen 4 has sufficient free space for storing icons of all applications belonging to the class of applications. The sequence number of screen 2 is shown in black, indicating that the screen 2 has insufficient free space for storing icons of all applications belonging to the class of applications.

In Step S205, the class of applications is moved into an area containing a sequence number of a target screen in the single-layer annular graph, and is then released.

In Step S206, it is determined whether there is enough space remaining in the target screen for storing the class of applications; if there is, the flow goes to step S207; otherwise if there is insufficient space, the flow goes to Step S211.

In an embodiment, it is detected whether the sequence number of the target screen is shown in a bright yellow font. If the sequence number of the target screen is shown in a bright yellow font, it means that there is enough space remaining in the target screen for storing the class of applications. Otherwise if the sequence number of the target screen is not shown in a bright yellow font, it means that space remaining in the target screen is insufficient for storing the class of applications, and a user may be notified that space remaining in the target screen is insufficient for storing the class of applications.

As shown in FIG. 4, sequence numbers of screens 1, 3, 4 are shown in bright yellow font, and the sequence number of screen 2 is shown in a black font. A class of applications in the screen 1 can be moved to the area containing the sequence number 4 or the area containing the sequence number 3, but can not be moved to the area containing the sequence number 2.

In Step S207, the area containing the sequence number of the target screen in the single-layer annular graph is highlighted.

In an embodiment, for example, as shown in FIG. 4, if a class of applications in the screen with sequence number 1 is moved to the area containing the sequence number 4, then the area containing the sequence number 4 will be highlighted, indicating that the class of applications is moved successfully.

In Step S208, information on the area containing the sequence number of the target screen is recorded, an icon management message corresponding to the move of the class of applications is sent, and a table Class_Screen is updated.

In an embodiment, after the class of applications is moved successfully, information on the area containing the sequence number of the target screen is recorded, and an icon management message is sent to a managing module of the mobile terminal. The icon management message includes an icon management type MsgType 2, indicating that the current moving operation involves move of a class of applications. After receiving the icon management message, the managing module updates the table Class_Screen, that is, updates the mapping relation between a class of applications and a screen.

In Step S209, application class layout displayed on the current screen and application class layout displayed on the target screen are refreshed.

In an embodiment, displayed layout of any class of applications on the current screen and on the target screen, and of icons of applications belonging to the any class of applications, are refreshed according to the table Class_Screen updated in step S208.

In Step S210, display of the single-layer annular graph is cancelled.

In an embodiment, when no class of applications is moved within a preset period of time, display of the single layer annular graph is cancelled.

In Step S211, a user is notified that space remaining in the target screen is insufficient for storing the class of applications.

If it is determined in Step S206 that space remaining in the target screen is insufficient for storing the class of applications, a notification that space remaining in the target screen is insufficient for storing the class of applications is provided on the current screen.

Figure 3:
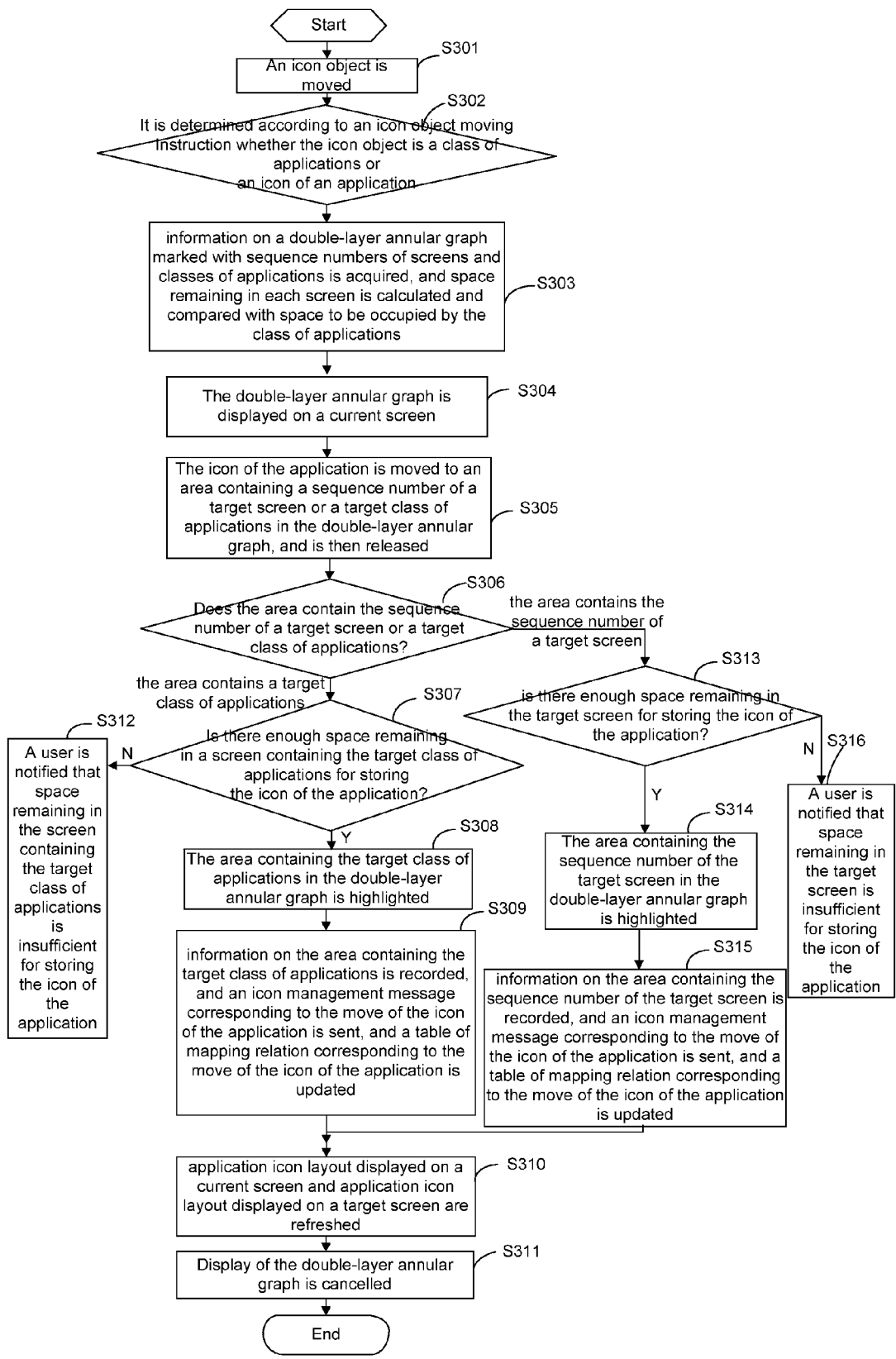
FIG. 3 is a flowchart of managing icon-display-by-screen or icon-display-by-class by moving an icon of an application in a method for application icon management in a mobile terminal according to an embodiment of the disclosure.

FIG. 3 is a flowchart of managing icon-display-by-screen or icon-display-by-class by moving an icon of an application in a method for application icon management in a mobile terminal according to an embodiment of the disclosure. As shown in FIG. 3, the flow of managing icon-display-by-screen or icon-display-by-class by moving an icon of an application according to the disclosure includes steps as follows.

In Step S301, an icon object is moved.

In an embodiment, after information on a class to which an application belongs is preset in the mobile terminal, and a table of mapping relation among a class of applications, a screen, and an application is established, an icon object of a class of applications or an icon of an application is dragged into a target screen or a target class of applications.

In Step S302, it is determined according to an icon object moving instruction whether the icon object is a class of applications or an icon of an application.

In an embodiment, when the icon object is moved, the type of the icon object (a class of applications or an icon of an application) needs to be determined in the first place according to the icon object moving instruction, and when the icon object is an icon of an application, the flow goes to step S303.

In Step S303, information on a double-layer annular graph marked with sequence numbers of screens and classes of applications is acquired, and space remaining in each screen is calculated and compared with space to be occupied by the icon of the application.

In an embodiment, when it is determined that the icon object is an icon of an application, information on the double-layer annular graph marked with sequence numbers of screens and classes of applications is acquired, and space remaining in each screen is calculated and compared with space to be occupied by the icon of the application.

Here, the information on the double-layer annular graph may include: a total size of the graph; a total number of screens in the mobile terminal; any class of applications already in each screen, and a number of classes of applications already in each screen; size of an area containing a class of applications; size of an area containing a sequence number of a screen; an identifier of a color of an area, an identifier of a color of storage space occupied by any class of applications and icons of applications belonging to the class in a screen, and the like.

In Step S304, the double-layer annular graph marked with sequence numbers of screens and classes of applications is displayed on a current screen.

Figure 5:
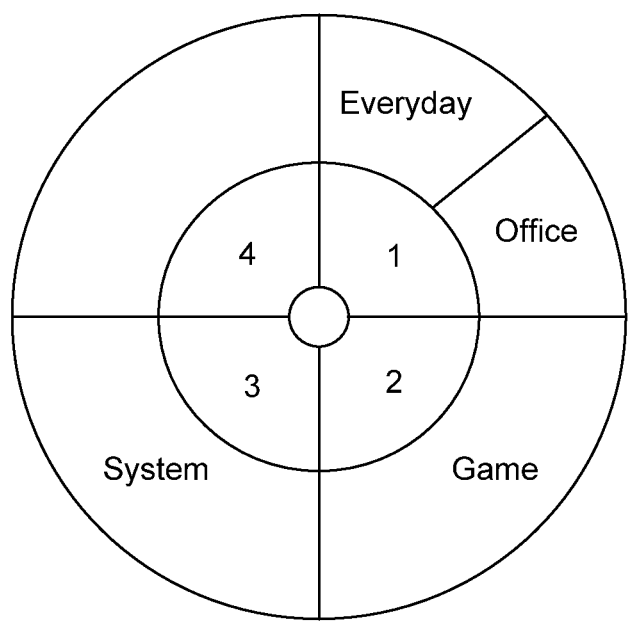
FIG. 5 is a schematic diagram of a structure of a double-layer annular graph displayed on a current screen in case an icon object to be moved is an icon of an application in a method for application icon management in a mobile terminal according to an embodiment of the disclosure.

In an embodiment, the double-layer annular graph displayed here, as shown in FIG. 5, includes four classes of applications, namely, everyday, office, game and system. Classes of applications displayed in a same screen occupy continuous areas in the double-layer annular graph and the continuous areas are in the same color. In an embodiment, the two classes of everyday and office are located in screen 1, the game is located in screen 2, the system is located in screen 3, and currently no icon of an application belonging to a class of applications is stored in screen 4. When there is enough space remaining in a screen, as calculated by the mobile terminal, for storing the icon of the application, the sequence number of the screen and any class of applications in the screen are shown in bright yellow. When the screen does not have sufficient free space, as calculated by the mobile terminal, for storing the icon of the application, the sequence number of the screen and any class of applications in the screen are shown in black. Here, the classes "everyday" and "office" and the sequence number "1" of the screen containing the classes "everyday" and "office" are in a bright yellow font; the class "system" and the sequence number "3" of the screen containing the class system are in a bright yellow font too; but class "game" and the sequence number "2" of the screen containing class game are in a black font. This indicates that the icon of the application may be stored in either screen 1 or screen 3, but may not be stored in screen 2, as space remaining in screen 2 is insufficient.

In Step S305, the icon of the application is moved into an area containing a sequence number of a target screen or into an area containing a target class of applications in the double-layer annular graph, and is then released.

In Step S306, it is determined whether the area contains the sequence number of a target screen or contains a target class of applications; If the area contains a target class of applications, the flow goes to Step S307; otherwise if the area contains the sequence number of a target screen, the flow goes to Step S313.

In an embodiment, after the icon of the application is moved into an area containing a sequence number of a screen or containing a class of applications in the double-layer annular graph, and is then released, it is detected whether the area is occupied by a class of applications or a sequence number of a screen. If the area is occupied by a class of applications, the flow goes to Step S307. If the area is occupied by a sequence number of a screen, the flow goes to Step S313.

As shown in FIG. 5, the icon of an application belonging to the class "system" in screen 3 may be moved to an area containing the sequence number "1" or "4", or to an area containing the class "everyday" or "office" in screen 1 (namely, to an area with a bright yellow font); but cannot be moved to an area containing the sequence number "2" or to an area containing the class "game" (namely, cannot be moved to an area with a black font).

In Step S307, it is determined whether there is enough space remaining in a screen containing the target class of applications for storing the icon of the application; if space remaining in the target screen is sufficient for storing the icon of the application, the flow goes to step S308; otherwise if space remaining in the target screen is insufficient for storing the icon of the application, the flow goes to Step S312.

In an embodiment, it is detected whether the target class of applications is shown in a bright yellow font, if the target class of applications is shown in a bright yellow font, it means that there is enough space remaining for storing the icon of the application. Otherwise if the target class of applications is not shown in a bright yellow font, it means that space remaining is insufficient for storing the icon of the application.

In Step S308, the area containing the target class of applications in the double-layer annular graph is highlighted.

In Step S309, information on the area containing the target class of applications is recorded, and an icon management message corresponding to the move of the icon of the application is sent, and a table of mapping relation corresponding to the move of the icon of the application is updated.

In an embodiment, after the icon of the application is moved successfully, the information on the area containing the target class of applications is recorded, and the icon management message corresponding to the move of the icon of the application is sent to a managing module of the mobile terminal. The icon management message includes an icon management type MsgType 3, indicating that the current moving operation involves move of an icon of an application into a target class of applications. After receiving the icon management message, the managing module of the mobile terminal checks the table App_Class to determine whether a mapping relation between the application and a class of applications exist, i.e., checks whether the application has been classified. If the application has not been classified, then the table App_Screen is called, and a mapping relation between the application and a screen in the table App_Screen is deleted; in addition, the table App_Class is called, and a mapping relation between the application and the target class of applications is added in the table App_Class; when the application is previously classified, the table App_Class is called, and the mapping relation between the application and a class of applications is updated.

In Step S310, application icon layout displayed on a current screen and application icon layout displayed on a target screen are refreshed.

In an embodiment, application icon layout displayed on the current screen and application icon layout displayed on the target screen are refreshed according to a table updated in step S309.

In Step S311, display of the double-layer annular graph is cancelled.

In an embodiment, when no application icon is moved within a preset period of time, display of the double-layer annular graph is cancelled.

In Step S312, a user is notified that space remaining in the screen containing the target class of applications is insufficient for storing the icon of the application.

In an embodiment, if it is determined in Step S307 that space remaining in the screen containing the target class of applications is insufficient for storing the icon of the application, then a notification that space remaining in the screen containing the target class of applications is insufficient for storing the icon of the application is provided on the current screen.

In Step S313, it is determined whether there is enough space remaining in the target screen for storing the icon of the application; if there is enough space, the flow goes to step S314; otherwise if space remaining in the target screen is insufficient for storing the icon of the application, the flow goes to Step S316.

In an embodiment, when the mobile terminal detects that the area where the icon of the application is released contains a sequence number of a screen, it is determined whether there is enough space remaining in the target screen for storing the icon of the application. That is, it is detected whether the sequence number of the target screen is shown in a bright yellow font. If the sequence number of the target screen is shown in a bright yellow font, it means that there is enough space remaining in the target screen for storing the icon of the application. Otherwise if the sequence number of the target screen is not shown in a bright yellow font, it means that space remaining in the target screen is insufficient for storing the icon of the application.

In Step S314, the area containing the sequence number of the target screen in the double-layer annular graph is highlighted.

In Step S315, information on the area containing the sequence number of the target screen is recorded, and an icon management message corresponding to the move of the icon of the application is sent, and a table of mapping relation corresponding to the move of the icon of the application is updated.

In an embodiment, after the icon of the application is moved successfully, the information on the area containing the sequence number of the target screen is recorded, and the icon management message corresponding to the move of the icon of the application is sent to the managing module of the mobile terminal. The icon management message includes an icon management type MsgType 4, indicating that the current moving operation involves move of an icon of an application into a target screen. After receiving the icon management message, the managing module of the mobile terminal checks the table App_Class to determine whether a mapping relation between the application and a class of applications exist, i.e., checks whether the application has been classified. If the application has not been classified, then the table App_Screen is called, and a mapping relation between the application and a screen is updated; when the application is previously classified, the table App_Class is called, and the mapping relation between the application and any class of applications in the table App_Class is deleted, and the table App_Screen is called to add a mapping relation between the application and the target screen in the table App_Screen. Then application class layout and application icon layout displayed on a screen is refreshed according to an updated table. When no application icon is moved within a preset period of time, display of the double-layer annular graph is cancelled.

In Step S316, a user is notified that space remaining in the target screen is insufficient for storing the icon of the application.

If it is determined in Step S313 that space remaining in the target screen is insufficient for storing the icon of the application, a notification that space remaining in the target screen is insufficient for storing the icon of the application is provided on the current screen.

Figure 6:
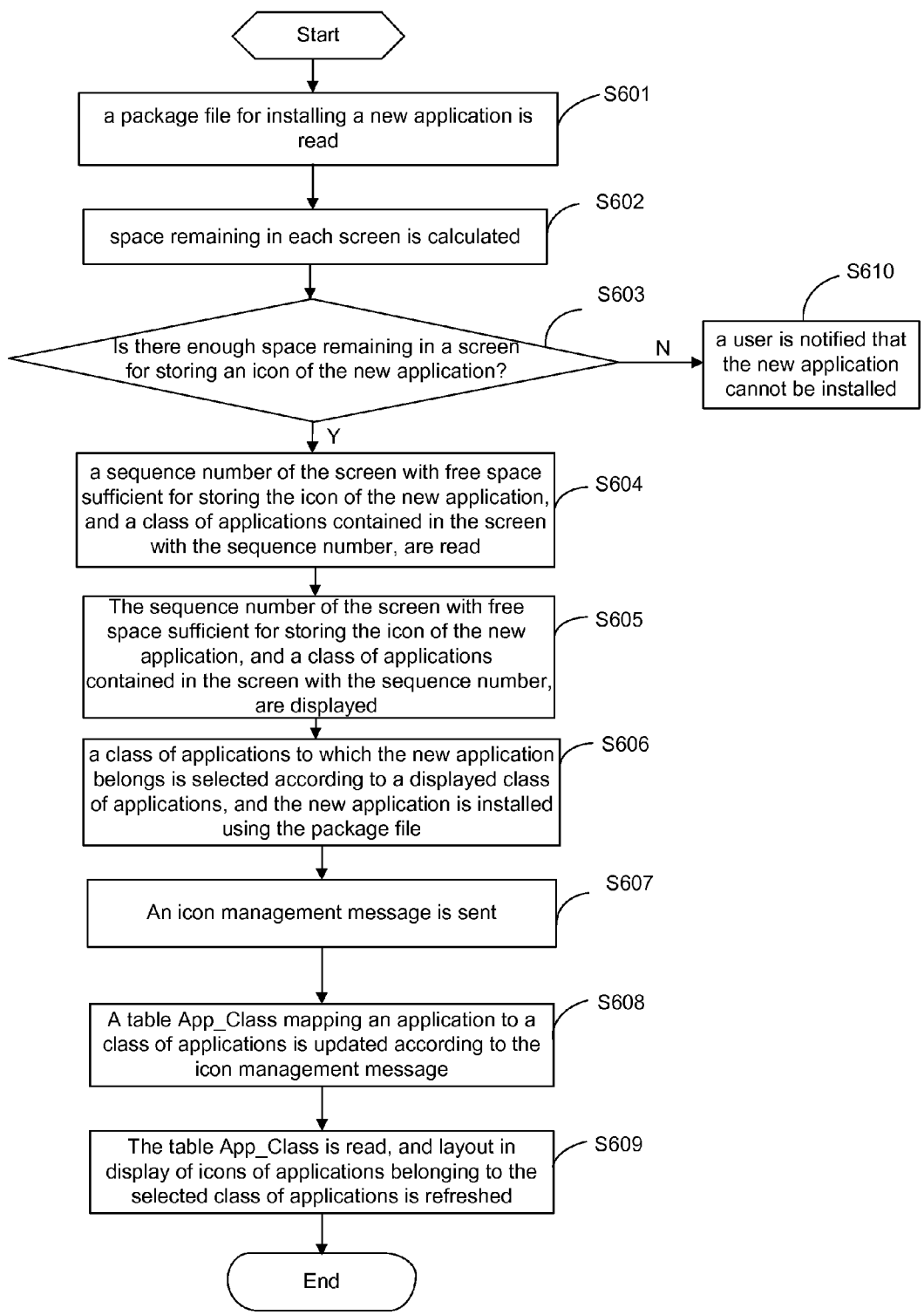
FIG. 6 is a flowchart, in installing a new application, of setting a class to which the new application belongs and directly managing display of the icon of the new application in a method for application icon management in a mobile terminal according to an embodiment of the disclosure.

FIG. 6 is a flowchart, in installing a new application, of setting a class to which the new application belongs and directly managing display of the icon of the new application in a method for application icon management in a mobile terminal according to an embodiment of the disclosure. As shown in FIG. 6, the flow, in installing a new application, of setting a class to which the new application belongs and directly managing display of the icon of the new application includes steps as follows.

In Step S601, a package file for installing a new application is read.

In an embodiment herein, in installing a new application, a mobile terminal will read a package file for installing the new application, where the package file may include information such as an icon of the application, a name of the package for installing the application and a hardware environment needed for installing the application.

In Step S602, space remaining in each screen is calculated.

In Step S603, it is determined whether there is enough space remaining in a screen for storing the icon of the new application; if there is enough space remaining in a screen for storing the icon of the new application, the flow goes to step S604; otherwise if no screen has enough free space for storing the icon of the new application, the flow goes to Step S610.

In Step S604, a sequence number of the screen with free space sufficient for storing the icon of the new application, and a class of applications contained in the screen with the sequence number, are read.

In an embodiment, when it is detected that there is enough space remaining in a screen for storing the icon of the new application, the mobile terminal will record and read the sequence number of the screen with free space sufficient for storing the icon of the new application and any class of applications contained in the screen with the sequence number.

In Step S605, the sequence number of the screen with free space sufficient for storing the icon of the new application, and a class of applications contained in the screen with the sequence number, are displayed.

In an embodiment, the mobile terminal displays on a current screen the sequence number of the screen with free space sufficient for storing the icon of the new application and a class of applications contained in the screen with the sequence number, such that a user may select a class for the new application to be installed.

In Step S606, a class of applications to which the new application belongs is selected according to a displayed class of applications, and the new application is installed using the package file.

In Step S607, an icon management message is sent.

In an embodiment, the icon management message includes the file name of the package for installing the application, the class to which the application belongs, the sequence number of the screen for display the application and an icon management type MsgType of the new application. The class to which the application belongs is that selected when the new application is installed, the MsgType is 1, indicating that during installing a new application, the mobile terminal directly manages display of the icon of the application by class.

In Step S608, a table App_Class is updated according to the icon management message.

In an embodiment, the managing module of the mobile terminal calls the table App_Class to update a mapping relation between an application and a class of applications according to the icon management message.

In Step S609, the table App_Class is read, and layout of icons of applications belonging to the selected class of applications in display is refreshed.

In an embodiment, after updating the table App_Class, the mobile terminal reads the table App_Class, and refreshes the layout of icons of applications belonging to the selected class of applications in display, implementing direct management of display of the icon of the new application.

In Step S610, a user is notified that the new application cannot be installed.

When it is detected that no screen has enough free space for storing the icon of the new application, a notification that the new application cannot be installed is provided in the current screen.

With the method for application icon management in a mobile terminal according to the disclosure, display of the icon of a new application by class can be managed directly by setting a class to which the new application belongs during installation of the new application, thereby saving any icon display management after the new application is installed.

Figure 7:
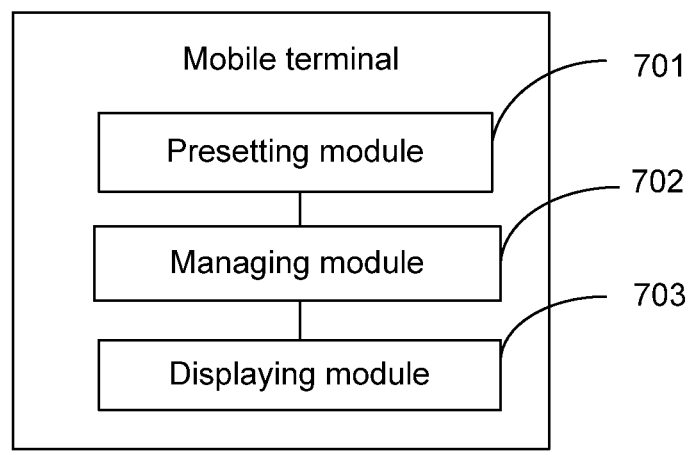
FIG. 7 is a schematic diagram of a modular structure of a mobile terminal according to an embodiment of the disclosure.

FIG. 7 is a schematic diagram of a modular structure of a mobile terminal according to an embodiment of the disclosure. As shown in FIG. 7, the mobile terminal according to the embodiment includes:

a presetting module 701 configured for: presetting information on a class to which an application belongs, and establishing a table of mapping relation among a class of applications, a screen, and an application;

a managing module 702 configured for: receiving an icon object moving instruction; acquiring information on a single-layer annular graph or a double-layer annular graph according to the icon object moving instruction; and updating, after successfully moving the icon object to be moved to an area on the single-layer annular graph or the double-layer annular graph, a table of mapping relation among a class of applications, a screen, and an application according to the move; and a displaying module 703 configured for: sending the icon object moving instruction to the managing module 702 and displaying on a current screen the single-layer annular graph or the double-layer annular graph according to the information on the single-layer annular graph or the double-layer annular graph acquired by the managing module 702.

The presetting module 701 may add a new class of applications in addition to a default class of applications in a mobile terminal, and modify or delete an existing class of applications through an application class customizing interface. Then, a table mapping a class of applications to a screen, a table mapping an application to a class of applications, and a table mapping an application to a screen are established respectively in advance according to affiliation in storing an icon of an application in a screen and in storing a class of applications in a screen.

Compared with an existing method for application icon management in a mobile terminal, with the mobile terminal according to the embodiment, in moving a class of applications or an icon of an application, icon management is simplified, and batch management and multi-mode management of icons of applications are achieved, thereby greatly facilitating application icon management by a user.

The managing module 702 may be further configured for:

after a class of applications to be moved is moved to an area containing a sequence number of a target screen in the single-layer annular graph, determining whether there is enough space remaining in the target screen for storing the class of applications to be moved; and after the class of applications is successfully moved to the area in the single-layer annular graph, receiving an icon management message sent by the displaying module 703 and updating the table mapping a class of applications to a screen according to the icon management message.

The displaying module 703 may be further configured for:

after the class of applications is moved successfully to the area in the single-layer annular graph, sending the icon management message corresponding to the move of the class of applications to the managing module 702, and refreshing application class layout displayed on the current screen and application class layout displayed on the target screen according to the table mapping a class of applications to a screen updated by the managing module.

The managing module 702 may be further configured for:

after the to-be-moved icon of the application is moved to an area containing a sequence number of a target screen or a target class of applications in the double-layer annular graph, determining whether there is enough space remaining in the target screen or a screen containing the target class of applications for storing the to-be-moved icon of the application; and after the icon of the application is successfully moved to the area containing the target class of applications in the double-layer annular graph, receiving an icon management message sent by the displaying module 703 and updating the table mapping an application to a class of applications according to the icon management message; and after the icon of the application is successfully moved to the area containing the sequence number of the target screen in the double-layer annular graph, receiving an icon management message sent by the displaying module 703 and updating the table mapping an application to a screen according to the icon management message.

The displaying module 703 may be further configured for:

after the icon of the application is successfully moved to the area containing the target class of applications in the double-layer annular graph, sending the icon management message corresponding to the move of the icon of the application to the managing module 702, and refreshing application icon layout displayed on the current screen and application icon layout displayed on the target screen according to the table mapping an application to a class of applications updated by the managing module 702; and after the icon of the application is successfully moved to the area containing the sequence number of the target screen in the double-layer annular graph, sending the icon management message corresponding to the move of the icon of the application to the managing module 702, and refreshing application icon layout displayed on the current screen and application icon layout displayed on the target screen according to the table mapping an application to a screen updated by the managing module 702.

The managing module 702 may be further configured for:

notifying the displaying module 703 to cancel display of the single-layer annular graph or the double-layer annular graph if no icon object moving operation is detected within a preset period of time.

Figure 8:
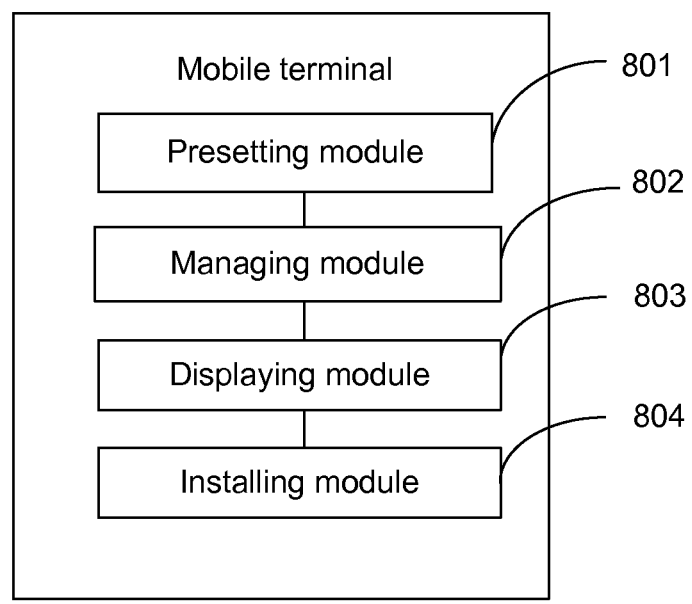
FIG. 8 is a schematic diagram of a modular structure of a mobile terminal according to an embodiment of the disclosure.

FIG. 8 is a schematic diagram of a modular structure of a mobile terminal according to an embodiment of the disclosure. As shown in FIG. 8, based on the mobile terminal according to the previous embodiment, the mobile terminal according to the current embodiment further includes:

an installing module 804 configured for installing a new application.

Specifically, the installing module 804 may be further configured for:

during installation of a new application, determining the class to which the new application belongs according to information on a class to which an application belongs preset by a presetting module 801 and a table Class_Screen, a table App_Class and a table App_Screen, sending an icon management message corresponding to application installation to a managing module 802 to notify the managing module 802 to update the table App_Class.

The managing module 802 may be further configured for:
receiving the icon management message sent by the installing module 804 and updating the table App_Class, i.e., according to the class information (selected class to which the new application belongs) preset during installation of the new application.

The displaying module 803 may be further configured for:
after the installation of the new application is completed, displaying the icon of the new application by class according to the class selected during its installation.

Compared with an existing method for application icon management in a mobile terminal, with the mobile terminal according to the embodiment, in moving a class of applications or an icon of an application, icon management is simplified, and batch management and multi-mode management of icons of applications are achieved, thereby greatly facilitating application icon management by a user. Moreover, with the mobile terminal according to the current embodiment, it is possible to set in an installation phase of a new application a class to which the new application belongs, and directly manage display of the icon of the new application by class, thereby saving any icon display management after the new application is installed.

What described are merely embodiments of the disclosure, and are not intended to limit the scope of protection of the disclosure. All equivalent structures and flow changes made using the specification and accompanying drawings of the disclosure, or direct or indirect applications of the disclosure to another related technical field should be included within the scope of protection of the disclosure.

The invention claimed is:

1. A method for application icon management in a mobile terminal, comprising:
   presetting information on a class to which an application belongs, and establishing a table of mapping relation among a class of applications, a screen, and an application;
   receiving an object moving instruction;
   determining, according to the object moving instruction, an object to be moved to be a class of applications or an icon of an application;
   acquiring information on a rule graph corresponding to the object to be moved according to the object moving instruction, by:
      in response to determining the object to be moved to be the class of the applications, acquiring information on a single-layer annular graph marked with sequence numbers of screens;
      in response to determining the object to be moved to be the icon of the application, acquiring information on a double-layer annular graph marked with the sequence numbers of the screens and classes of applications;
   calculating space remaining in each of the screens;
   comparing the space remaining in the each of the screens with space to be occupied by the object to be moved;
   displaying the information on the rule graph, by:
      in response to determining the object to be moved to be the class of the applications, displaying the single-layer annular graph marked with the sequence numbers of the screens, by showing a sequence number of a screen in bright yellow when there is enough space remaining in the screen for storing icons of the applications belonging to the class of the applications, and showing the sequence number of the screen in black when the screen does not have sufficient free space for storing the icons of the applications belonging to the class of the applications;
      in response to determining the object to be moved to be the icon of the application, displaying the double-layer annular graph marked with the sequence numbers of the screens and the classes of applications, by showing a sequence number of a screen and any class of applications in the screen in bright yellow when there is enough space remaining in the screen for storing the icon of the application, and showing the sequence number of the screen and the any class of applications in the screen in black when the screen does not have sufficient free space for storing the icon of the application;
   after the class of the applications is moved to and released in an area containing a sequence number of a target screen in the single-layer annular graph, determining whether there is enough space remaining in the target screen for storing the object to be moved, by detecting whether the sequence number of the target screen is shown in bright yellow;
   or, after the icon of the application is moved to and released in an area containing a sequence number of a target screen or an area containing a target class of applications contained in a target screen in the double-layer annular graph, determining whether there is enough space remaining in the target screen for storing the object to be moved, by detecting whether the sequence number of the target screen or the target class of applications is shown in bright yellow;
   in response to determining that there is enough space remaining in the target screen for storing the object to be moved, highlighting the area containing the sequence number of the target screen or the area containing the target class of applications, indicating that the object to be moved is moved successfully;
   updating, after successfully moving the object to be moved to an area on the rule graph, the table of mapping relation among a class of applications, a screen, and an application according to the move;
   when no object is moved within a preset period of time, cancelling display of the rule graph.

2. The method according to claim 1, wherein the establishing a table of mapping relation among a class of applications, a screen, and an application comprises:
   respectively establishing a table mapping a class of applications to a screen, a table mapping an application to a class of applications, and a table mapping an application to a screen according to affiliation in storing an icon of an application in a screen and in storing a class of applications in a screen.

3. The method according to claim 2, wherein the updating, after successfully moving the object to be moved to an area on the rule graph, the table of mapping relation among a class of applications, a screen, and an application according to the move comprises:
   after the class of applications to be moved is successfully moved to the area containing the sequence number of the target screen in the single-layer annular graph, updating the table mapping a class of applications to a screen; and refreshing application class layout displayed on a current screen and application class layout displayed on the target screen; or after the to-be-moved icon of the application is successfully moved to the area containing the sequence number of the target screen or the target class of applications in the double-layer annular graph, updating the table mapping an application to a class of applications, or the table mapping an application to a screen; and refreshing application icon layout displayed on a current screen and application icon layout displayed on the target screen.

4. The method according to claim 2, further comprising: after the presetting information on a class to which an application belongs, and establishing a table of mapping relation among a class of applications, a screen, and an application,
updating the table mapping an application to a class of applications according to information on a class to which a new application belongs preset in installing the new application.

5. A mobile terminal, comprising:
a processor; and
memory storing instructions executable by the processor, wherein the processor is configured for:
presetting information on a class to which an application belongs, and establishing a table of mapping relation among a class of applications, a screen, and an application;
receiving an object moving instruction;
determining, according to the object moving instruction, an object to be moved to be a class of applications or an icon of an application;
acquiring information on a rule graph corresponding to the object to be moved according to the object moving instruction, by:
in response to determining the object to be moved to be the class of the applications, acquiring information on a single-layer annular graph marked with sequence numbers of screens;
in response to determining the object to be moved to be the icon of the application, acquiring information on a double-layer annular graph marked with the sequence numbers of the screens and classes of applications;
calculating space remaining in each of the screens;
comparing the space remaining in the each of the screens with space to be occupied by the object to be moved;
displaying the information on the rule graph, by:
in response to determining the object to be moved to be the class of the applications, displaying the single-layer annular graph marked with the sequence numbers of the screens, by showing a sequence number of a screen in bright yellow when there is enough space remaining in the screen for storing icons of the applications belonging to the class of the applications, and showing the sequence number of the screen in black when the screen does not have sufficient free space for storing the icons of the applications belonging to the class of the applications;
in response to determining the object to be moved to be the icon of the application, displaying the double-layer annular graph marked with the sequence numbers of the screens and the classes of applications, by showing a sequence number of a screen and any class of applications in the screen in bright yellow when there is enough space remaining in the screen for storing the icon of the application, and showing the sequence number of the screen and the any class of applications in the screen in black when the screen does not have sufficient free space for storing the icon of the application;
after the class of the applications is moved to and released in an area containing a sequence number of a target screen in the single-layer annular graph, determining whether there is enough space remaining in the target screen for storing the object to be moved, by detecting whether the sequence number of the target screen is shown in bright yellow;
or, after the icon of the application is moved to and released in an area containing a sequence number of a target screen or an area containing a target class of applications contained in a target screen in the double-layer annular graph, determining whether there is enough space remaining in the target screen for storing the object to be moved, by detecting whether the sequence number of the target screen or the target class of applications is shown in bright yellow;
in response to determining that there is enough space remaining in the target screen for storing the object to be moved, highlighting the area containing the sequence number of the target screen or the area containing the target class of applications, indicating that the object to be moved is moved successfully;
updating, after successfully moving the object to be moved to an area on the rule graph, the table of mapping relation among a class of applications, a screen, and an application according to the move;
when no object is moved within a preset period of time, cancelling display of the rule graph.

6. The mobile terminal according to claim 5, wherein the establishing a table of mapping relation among a class of applications, a screen, and an application comprises:
respectively establishing a table mapping a class of applications to a screen, a table mapping an application to a class of applications, and a table mapping an application to a screen according to affiliation in storing an icon of an application in a screen and in storing a class of applications in a screen.

7. The mobile terminal according to claim 6, wherein the updating, after successfully moving the object to be moved to an area on the rule graph, the table of mapping relation among a class of applications, a screen, and an application according to the move comprises:
after the class of applications to be moved is successfully moved to the area containing the sequence number of the target screen in the single-layer annular graph, updating the table mapping a class of applications to a screen; and refreshing application class layout displayed on a current screen and application class layout displayed on the target screen; or
after the to-be-moved icon of the application is successfully moved to the area containing the sequence number of the target screen or the target class of applications in the double-layer annular graph, updating the table mapping an application to a class of applications, or the table mapping an application to a screen; and refreshing application icon layout displayed on a current screen and application icon layout displayed on the target screen.

8. The mobile terminal according to claim 6, wherein the processor is further configured for: after presetting the information on the class to which the application belongs, and establishing the table of mapping relation among a class of applications, a screen, and an application, updating the table mapping an application to a class of applications according to information on a class to which a new application belongs preset in installing the new application.

\* \* \* \* \*